(12) United States Patent
Rudek et al.

(10) Patent No.: US 10,235,370 B2
(45) Date of Patent: Mar. 19, 2019

(54) METHODS AND APPARATUS FOR PROVIDING UNIFIED TRANSMISSION TRACKING SERVICES

(71) Applicant: Bank of America Corporation, Charlotte, NC (US)

(72) Inventors: Patricia Rudek, Rochester, NY (US); Michelle D. Nichols, Rock Hill, SC (US)

(73) Assignee: Bank of America Corporation, Charlotte, NC (US)

( * ) Notice: Subject to any disclaimer, the term of this patent is extended or adjusted under 35 U.S.C. 154(b) by 600 days.

(21) Appl. No.: 14/635,363

(22) Filed: Mar. 2, 2015

(65) Prior Publication Data

US 2016/0260066 A1   Sep. 8, 2016

(51) Int. Cl.
| G06F 17/30 | (2006.01) |
| G06Q 20/08 | (2012.01) |
| G06Q 20/16 | (2012.01) |
| G06Q 20/40 | (2012.01) |
| G06Q 40/02 | (2012.01) |

(52) U.S. Cl.
CPC ....... *G06F 17/30082* (2013.01); *G06Q 20/08* (2013.01); *G06Q 20/16* (2013.01); *G06Q 20/401* (2013.01); *G06Q 40/02* (2013.01)

(58) Field of Classification Search
CPC .... G06Q 20/10; G06Q 20/102; G06Q 20/108; G06Q 20/08; G06Q 20/0855; G06Q 20/16; G06Q 20/209; G06Q 20/401
See application file for complete search history.

(56) References Cited

U.S. PATENT DOCUMENTS

| 6,654,350 | B1* | 11/2003 | Ramey | H04L 12/14 370/252 |
| 8,094,797 | B2 | 1/2012 | Dellarole et al. | |
| 8,527,419 | B1* | 9/2013 | Huff | G06Q 40/02 382/137 |
| 2002/0055907 | A1* | 5/2002 | Pater | G06Q 20/04 705/39 |
| 2004/0123293 | A1* | 6/2004 | Johnson | G06F 9/466 718/101 |
| 2004/0193552 | A1* | 9/2004 | Ikenaga | G06Q 10/02 705/75 |
| 2005/0044043 | A1* | 2/2005 | Gooding | G06Q 20/108 705/42 |
| 2005/0222894 | A1* | 10/2005 | Klein | G06Q 10/063 705/7.11 |

(Continued)

*Primary Examiner* — David T. Brooks
(74) *Attorney, Agent, or Firm* — Weiss & Arons LLP; Michael A. Springs, Esq.

(57) ABSTRACT

An apparatus for providing a data validation service on behalf of an entity is provided. The apparatus may include a receiver configured to receive a file from a client and a processor. The processor may be configured to assign a file identification number to the file, forward the file to an operations area within the entity, and provide data validation relating to the file based on the file identification number. When the file is located in the operations area, the file may retain its file identification number originally assigned to the file upon receipt by the entity. When the data validation request includes a request for file status information, the file status information response to the request may include one of collected, not collected and suspended.

21 Claims, 7 Drawing Sheets

(56) References Cited

U.S. PATENT DOCUMENTS

| | | | | |
|---|---|---|---|---|
| 2006/0010070 A1* | 1/2006 | Banaugh | ............... | G06Q 20/10 |
| | | | | 705/40 |
| 2009/0070171 A1* | 3/2009 | Patterson | ............. | G06Q 20/108 |
| | | | | 705/75 |
| 2009/0204530 A1* | 8/2009 | Hanson | ................ | G06Q 20/10 |
| | | | | 705/35 |
| 2010/0030688 A1* | 2/2010 | Patterson | ............. | G06Q 20/02 |
| | | | | 705/44 |
| 2011/0119188 A1* | 5/2011 | Clayton | ............... | G06Q 10/06 |
| | | | | 705/44 |
| 2014/0075579 A1 | 3/2014 | Baltes et al. | | |
| 2014/0304828 A1* | 10/2014 | Hollier | ................ | G06F 21/606 |
| | | | | 726/26 |
| 2015/0142665 A1* | 5/2015 | Dicker | ............... | G06Q 20/0453 |
| | | | | 705/64 |
| 2015/0363755 A1* | 12/2015 | Walden | ................ | G06Q 40/02 |
| | | | | 705/43 |

\* cited by examiner

METHODS AND APPARATUS FOR PROVIDING UNIFIED TRANSMISSION TRACKING SERVICES

FIELD OF TECHNOLOGY

This application relates to providing transmission tracking and data validation solutions.

BACKGROUND OF THE DISCLOSURE

Financial institutions ("FIs") store and provide information. Typically, that information relates to various financial transactions. Some of the transactions may be reported and/or executed in the form of a file transfer.

Typically, clients and associates of an FI need to access various aspects of files related to transactions. For example, clients and associates may need to know the date and time that a file was received, processed and/or transmitted by the FI.

Clients and associates may need to know the total value of the items in the file. Clients and associates may need to know the number of items in the file. Clients and associates may need to know whether there were any files rejected from a group of files. Finally, clients and associates may need to know the "chain of custody" of the file—i.e., who is currently in possession or responsible for the file.

It would be desirable to present some quanta of information about the file via a client and/or associate-accessible portal.

It would be further desirable to present the information necessary to answer a majority of client and/or associate inquiries about the file via the client and/or associate-accessible portal.

It would be still further desirable to provide clients and/or associates a search capability for such files whereby the clients and/or associates could search by date, time and/or amount if they so choose.

It would also be desirable if the client and/or associate could total debits and credits in one or more of the file(s). It would also be desirable if the client and/or associate could total debits and credits in more than one files separately from the debits and credits in another file.

SUMMARY OF THE INVENTION

A method for providing unified transmission tracking services to an entity is provided. The method may include receiving a file from a client. The method may further include assigning a file identification number to the file.

The method may also include forwarding the file to an operations area within the entity and assigning an operations area identification number to the file. In response to a request for data validation, the method may include providing data validation based only on the file identification number. The data validation may include file status information. The file status information may include one of collected, not collected and suspended.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
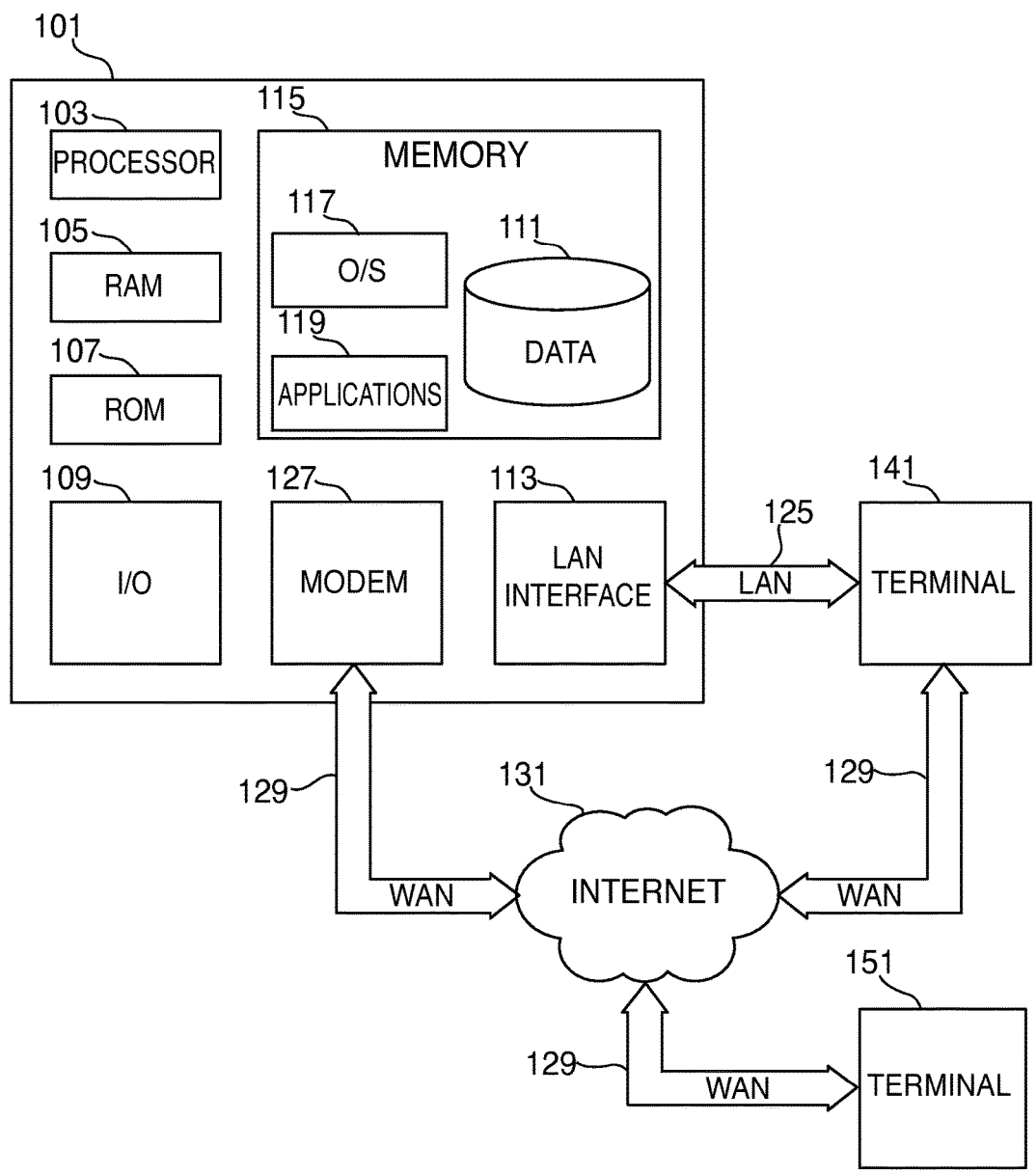
FIG. 1 shows an illustrative apparatus in accordance with principles of the invention.

Apparatus, methods and media (collectively referred to herein as a "system") for providing unified transmission tracking services are provided.

For the sake of illustration, the invention will be described as being performed by a "system." The "system" may include one or more of the features of the apparatus and methods that are shown or described herein and/or any other suitable device or approach. The "system" may be provided by an entity. The entity may be an individual, an organization or any other suitable entity.

Within a financial institution ("FI") certain operation areas for processing financial transactions may exist. Such operation areas may include an Automated Clearing House ("ACH") operation area, a Data Transmission Service ("DTS") operation area—e.g., an operations area that handles all data traffic between clients and the FI—a account reconciliation process ("ARP") operation area, a lockbox operation area, or any other suitable operation area.

The embodiments relate to tracking the file through the different operation areas. Each file at DTS, upon receipt of the file at the FI, has a file identifier ("ID").

After the transfer of the file to an operations area, each operation area may provide its own transaction identifier. For example, the ACH may include a transaction ID, a platform ID, and/or a point ID. The ARP may provide an account number. The lockbox may provide a lockbox number and an account number. While the FI may assign a transaction identifier to every transaction that it receives, nevertheless, the individual operation areas may overwrite the original transaction with the operation area's individual transaction identifiers. As such, the transaction identifier which the DTS ID assigns at the time of receipt by the FI gets discarded after the transfer to the operations area (while DTS is one of the of operations areas, DTS is primarily responsible of receipt of file intake from clients and/or associates.)

Clients of FIs may execute transactions that include transactions for all of the above exemplary operation areas. However, when the client needs to perform analysis on its own transactions with the FIs, it may be faced with the difficult prospect of performing analysis on transactions identified differently by each operation area. In such a scenario, if the client was searching for a transaction, it may have to perform four different searches in order to complete a search for a transaction. In some scenarios, the client search may return an indication of the status of the file—e.g., reject, completion, etc.

Systems and methods in accordance with the invention may preferably provide a data identifier that bridges all internal operation areas of an FI, and preferably remains with the transaction for the duration of the existence of the transaction within the FI's systems. Such an identifier may allow the systems to maintain file end-to-end file identification integrity. It should be noted that, during certain intervals, the data identifier may co-exist with an operations area data identifier. However, in preferred embodiments, the initial data identifier will preferably pre-date the operations area data identifier as well as outlive the operations area data identifier.

Such an initial identifier may be a single identifier for a transaction. Such an identifier may be associated with a transaction in addition to the unique operation area identifiers that already exist. Such an identifier may be maintained from the time of receipt at the FI and the operation areas may not add additional identifiers. Also embodiments preferably enable filtering files by protocol and managing in the aggregate as well as making changes based on individual files. Thus, each item would preferably be actionable by itself or as part of a group or batch.

In addition, such an identifier may provide client notification that the file was processed at a single point of entry—e.g., DTS.

Furthermore, such improved systems and methods may include data transmission protocols that include novel processes for transmitting fields to the FI. Such processes may require customized software on the client side as well as security protocols such as encryption or other suitable secure transmission methods.

In conventional systems, when clients want to transmit a file, a user could review the file and release it, or review it and release it using a Voice Response Unit ("VRU").

Systems and methods according to the invention may preferably replace the need for VRU. Such systems may also implement Straight Through Processing (STP), which is independent of human involvement—i.e., no human touch is associated with the file release—or STP lite, which includes a limited level of human involvement.

Entitlements may also play a role as they may identify whether the process is STP, STP lite, or almost all manual.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of system 100 based on a computer 101. The computer 101 may have a processor 103 for controlling the operation of the apparatus and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module 109 may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other devices. These devices may be identical to system 100 or different. The differences may be related to hardware components and/or software components.

Figure 2:
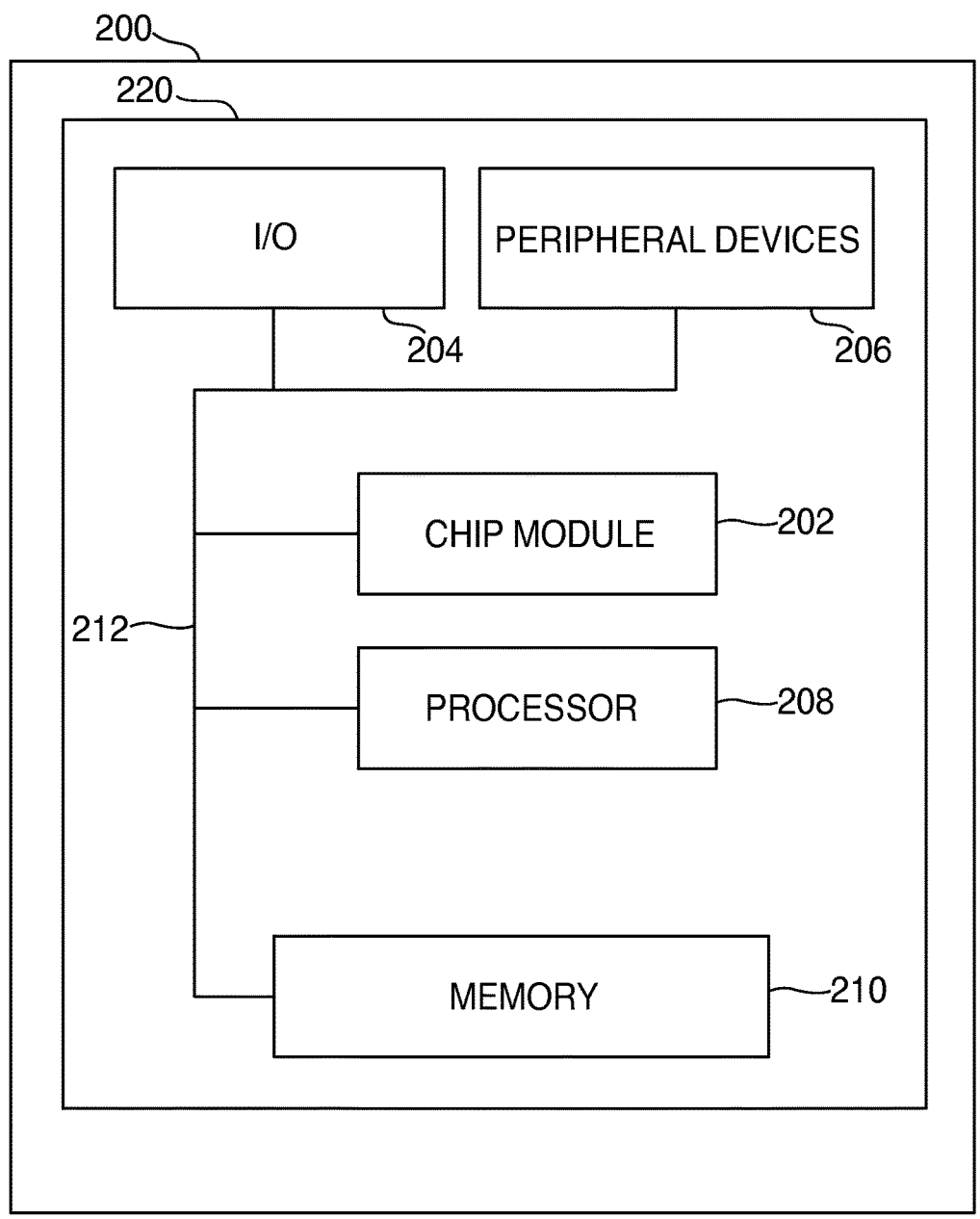
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, provide responses to client and/or associate queries, and machine-readable memory 210.

Machine-readable memory 210 may be configured to store in machine-readable data structures: information pertaining to a signatory, information pertaining to the current time, information pertaining to historical file transfers, information relating to client and/or associate queries, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
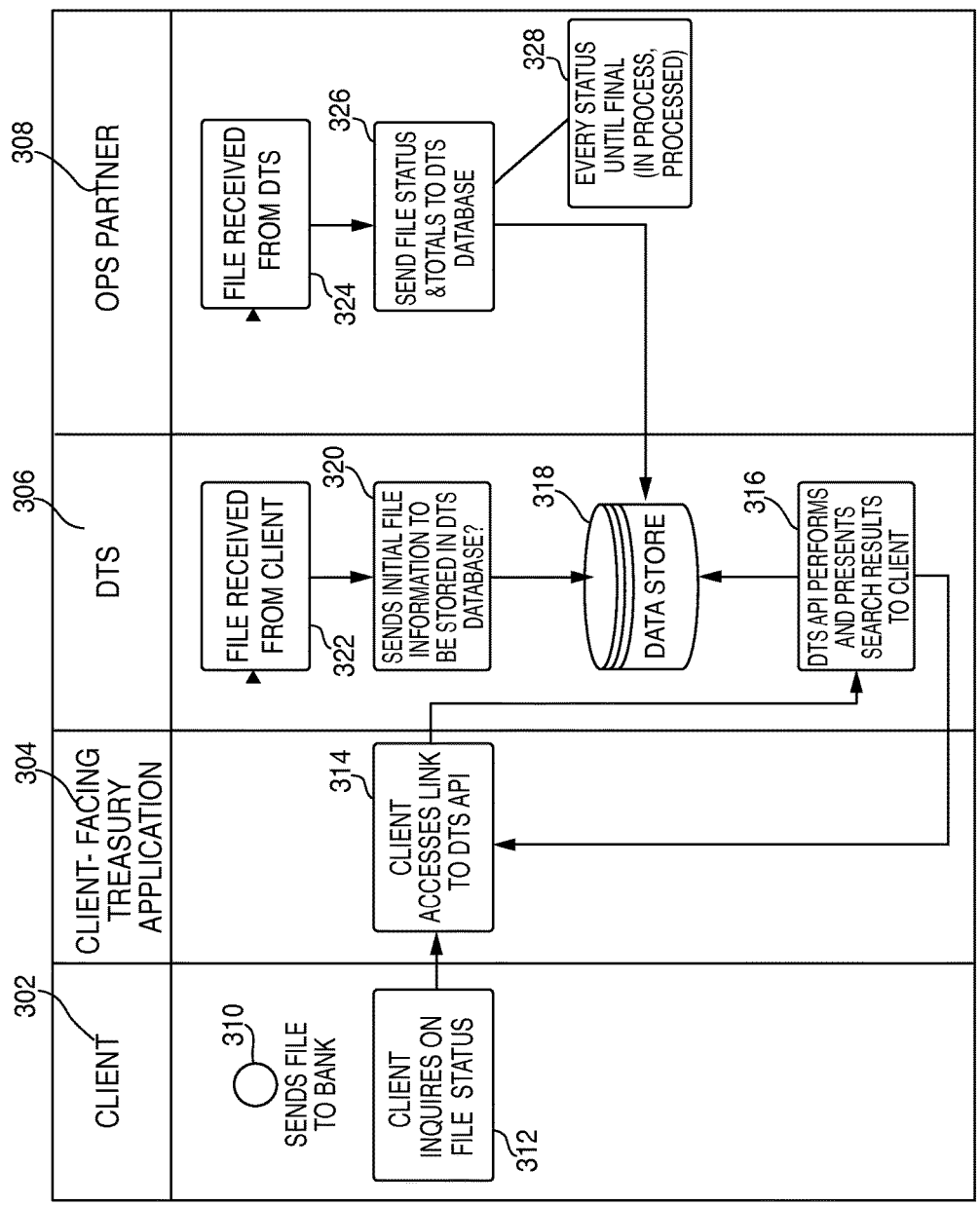
FIG. 3 shows an illustrative flow diagram in accordance with the principles of the invention.

FIG. 3 shows an illustrative flow chart in accordance with certain embodiments of the invention. FIG. 3 is directed to a process for providing client access to file transmission information.

Lane 302 illustrates client inquiries and other actions. Lane 304 shows a treasury application. Lane 306 shows a DTS lane in accordance with embodiments of the invention. Lane 308 shows an operations ("ops") partner lane in accordance with embodiments of the invention.

Lane 302 shows, as an initial stage, receiving a file from a client of the bank, 310. Step 312 shows the client inquiring regarding the file status. Such an inquiry may receive a response such as "not collected", "collected", "suspended" or any other suitable indication of file status. The description of these terms is set forth in more detail in the portion of the specification corresponding to FIG. 5.

Lane 304 shows the treasury application lane. In the embodiment shown in FIG. 3, step 314 shows that treasury application lane 304 provides, preferably in response to client inquiry 314, a client link to the DTS application programming interface ("API").

Lane 306 shows, at step 320, sending an initial file information to be stored in a database. Lane 306 shows, at step 322, that the file may be received from the client. Initially, DTS may assign a preferably unique DTS ID to the file. In addition, DTS may send the initial file information for storage at database 318.

Database 318 may receive the file. Database 318 may also receive one more search requests from clients via DTS API as shown at step 316. Database 318 may preferably respond to such requests.

Lane 308 shows an ops partner. As stated above, an ops partner may be understood to be an operations area within an entity that provides its own transaction identifier for the transactions with which it is associated. Lane 308 shows that the ops partner may receive a file pertaining to the ops partner from DTS, as shown in step 324. Thereafter, the ops partner may send the file status and totals to DTS database 318. Step 326 shows sending file status and totals to DTS database. Step 328 indicates further that every status until final status is sent along to database 318.

Figure 4:
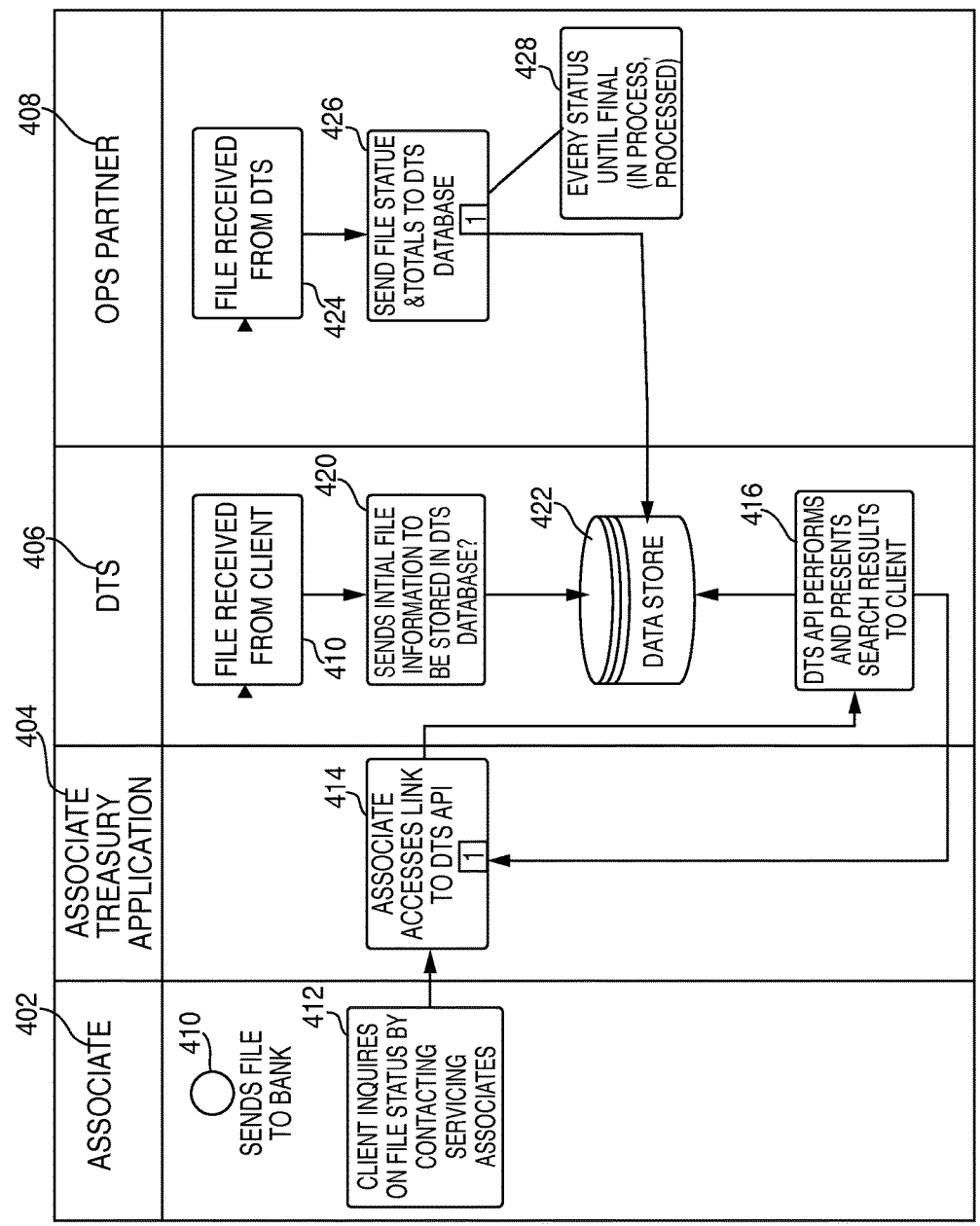
FIG. 4 shows another illustrative flow diagram in accordance with the principles of the invention.

FIG. 4 shows another illustrative flow diagram in accordance with the principles of the invention. Specifically, FIG. 4 is directed to a process for providing entity associate access to file transmission information.

Lane 402 illustrates associate inquiries and other actions. Lane 404 shows a treasury application. Lane 406 shows a DTS lane in accordance with embodiments of the invention. Lane 408 shows an operations ("ops") partner lane 408 in accordance with embodiments of the invention.

Lane 402 shows, as an initial stage, receiving a file from an associate of the entity, as shown in 410. Step 412 shows the client inquiring regarding file status being directed to the associate. The status identifiers are preferably the same for the associate as they would be for the client.

Lane 404 shows an associate treasury application lane. In the embodiment shown in FIG. 4, step 414 shows that treasury application 404 provides, preferably in response to associate inquiry 414, a link to the DTS application programming interface ("API").

Lane 406 shows, at step 410, that the file may be received from the client (and not the associate). Initially, DTS may assign a preferably unique DTS ID to the file. DTS may also send the initial file information 420 for storage at database 422.

Database 418 may receive the file. Database 418 may also receive one or more search requests from clients who are submitting through associates. The associates may submit the client inquiries via DTS API as shown at step 416. Database 418 may preferably respond to such requests.

Lane 408 shows an ops partner. Lane 408 shows that the ops partner may receive a file pertaining to the ops partner from DTS, as shown in step 424. Thereafter, the ops partner may send the file status and file totals to DTS database 418. Step 426 indicates sending file status and totals to DTS database. Step 428 indicates further that every status until final status may be sent along to database 418.

Figure 5:
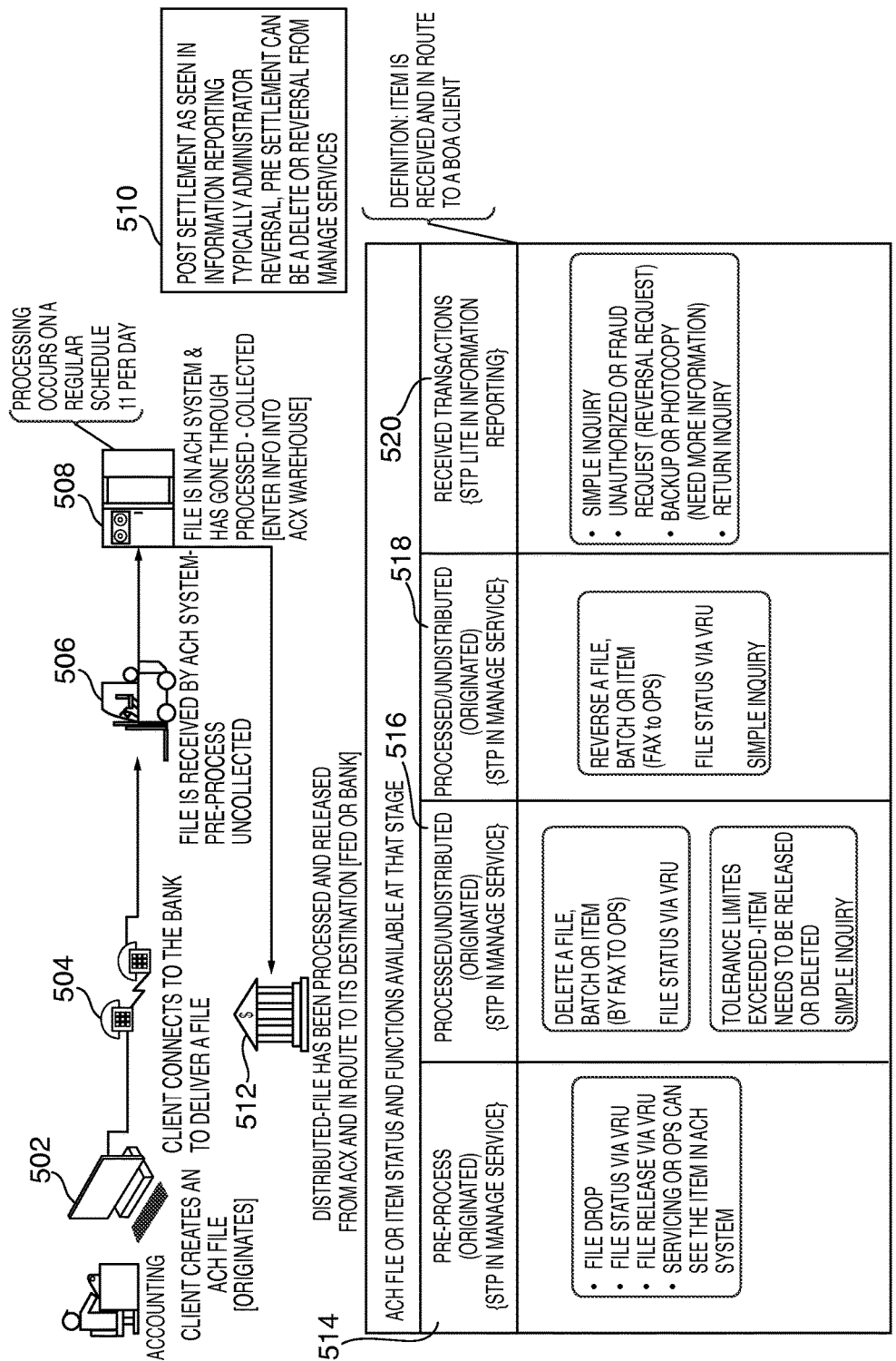
FIG. 5 shows yet another illustrative flow diagram in accordance with the principles of the invention.

FIG. 5 shows a current process for handling ACH transactions. Step 502 show that a client creates an ACH file. This is typically referred to as origination.

Step 504 shows the client connecting to the bank or other FI to deliver a file. The file could be stored in any suitable format such as EDI https, proprietary treasury application or other format. Such a file may typically contain an instruction to execute the ACH transmission originated in step 502.

Step 506 shows that the file may be received by an ACH system and may be considered as having a status of "pre-process"—i.e., uncollected. At step 508, the file processing occurs. It should be noted that such file processing may occur at regular intervals—e.g., 11 times a day.

Step 508 further shows that the file has now been processed in the ACH system and may be referred to by the term, "collected." Following "collection", the information for the processing may be entered into the ACX warehouse—i.e., the United States ACH processing platform. Step 510 shows that post-settlement changes to a file typically require a reversal whereas pre-settlement changes to a file may be implemented using a delete and/or reversal received from an appropriate administrator.

Lanes 514-520 may show the ACH file or item status and assorted functions that are available at the stage represented by the status identifier.

Lane 514 shows the pre-process (originated) lane which preferably includes Straight Through Processing ("STP"). Lane 514 further shows the following features that form a portion of file origination: file drop; file status via a voice response unit ("VRU"); file release via VRU; and/or servicing partner or ops partner can see the item in the ACH system.

Lane 516 shows the "processed/undistributed" lane. Process undistributed lane preferably includes the ability to delete a file, a batch of files or an individual item. Such deletion is typically executed by sending a fax to the ops partner.

In certain circumstances, for example when tolerance levels for the file are exceeded—an item and/or a file may need to be released and/or deleted.

Lane 518 shows the "process/distributed" lane. Such a lane may enable reversal of a file, batch or item via a fax to an ops partner. File status may be available from VRU and/or an inquiry.

Lane 520 shows received transactions. In such transactions, STP lite may be available in information reporting ("IR"). Lane 510 shows that received transactions may be accessible via a simple inquiry; unauthorized transaction, item, or file or fraud request (reversal request); backup or photocopy request—i.e., more information is needed; and a return inquiry.

Figure 6:
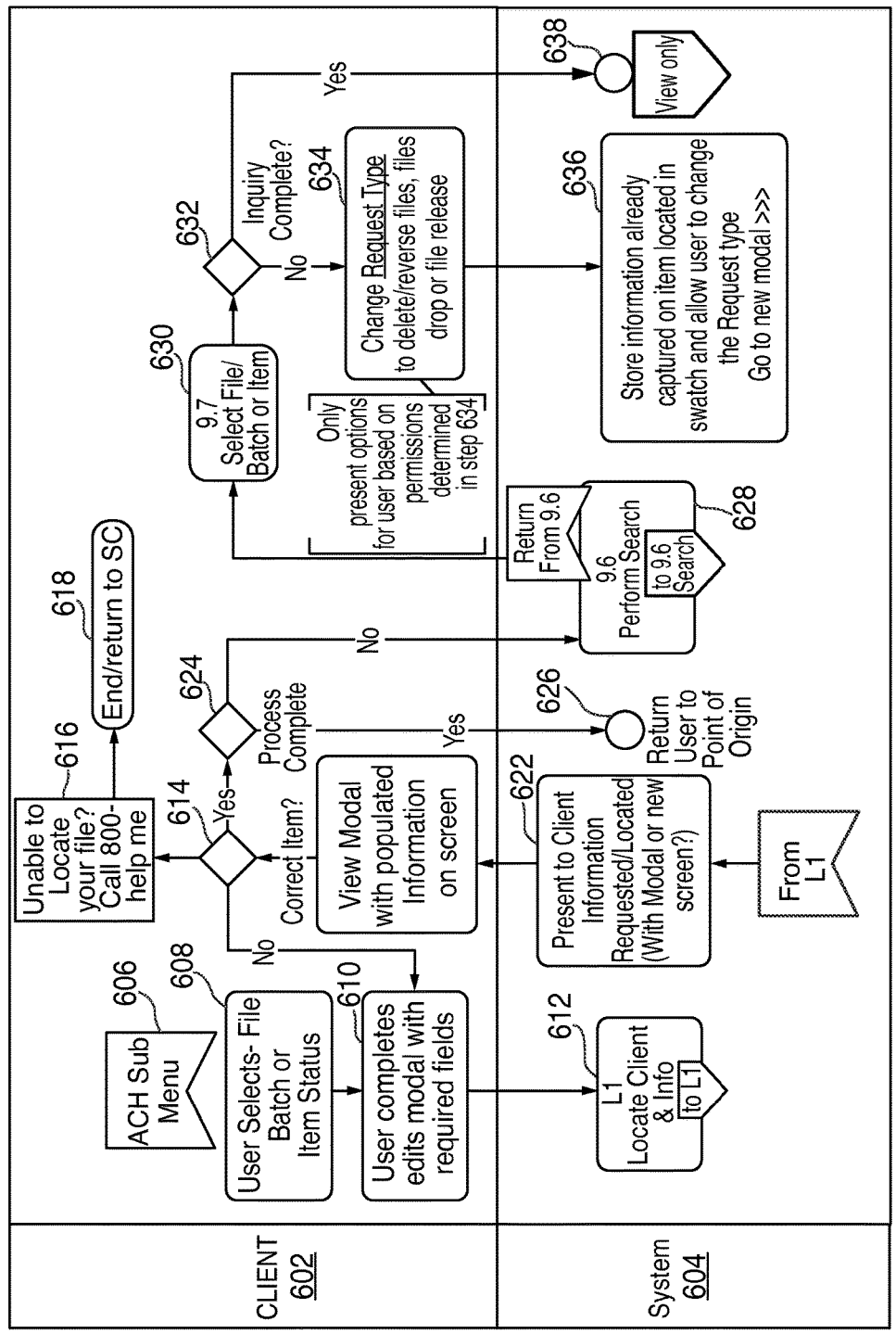
FIG. 6 shows still another illustrative flow diagram in accordance with the principles of the invention.

FIG. 6 shows another illustrative flow diagram in accordance with the principles of the invention. Specifically, FIG. 6 shows servicing a file or item status in accordance with the principles of the invention.

FIG. 6 includes an exemplary client lane 602 interaction with a system lane 604 interaction. Step 606 shows providing an ACH sub-menu to a client for performing a search, or requesting a different service, regarding an ACH origination.

Step 608 shows that the user can select origination of a file, batch of files or an item. Step 610 shows that a user edits and/or completes modal—i.e., a preferably custom-designed template with various relevant fields—with required fields.

Thereafter, at step 612, the system may locate the client request and information associated therewith.

At step 622, the system may receive the located client request and information associated therewith. The system may present the user the received information within the user modal or within a new screen.

The user may view the modal with populated information on his or her screen, as shown at step 614. The user may be queried to correct an item, or may correct an item absent a user query, at step 614.

If the user is unable to correct the file using the modal, the user may be shifted to another screen or to help information at step 616 and then returns to the basic screen at step 618.

If the user is able to correct his issues, then a determination may be made as to whether the process is complete, as shown at step 624. If the process is complete, then the user may be returned to the point of origin, as shown at step 626.

If the process is not complete, then another search may be performed by the system, in response to an additional user request, at step 628. The user may select a file, batch or item from the search results, as shown at step 630.

If the inquiry is complete in view of the newly returned search items, then the user may be sent to a view only screen as shown at step 638.

If the inquiry is not complete, then the request type may be changed to delete/reverse file, file drop or file release at 634. It should be noted that relevant options should be presented to appropriately entitled reviewers.

At step 636, the method may store information already captured on an item located in search and enable the user to change the request type. Thereafter, the user may change the request type.

Step 638 shows that if the inquiry is complete, the available screen may be reverted to view only.

Figure 7:
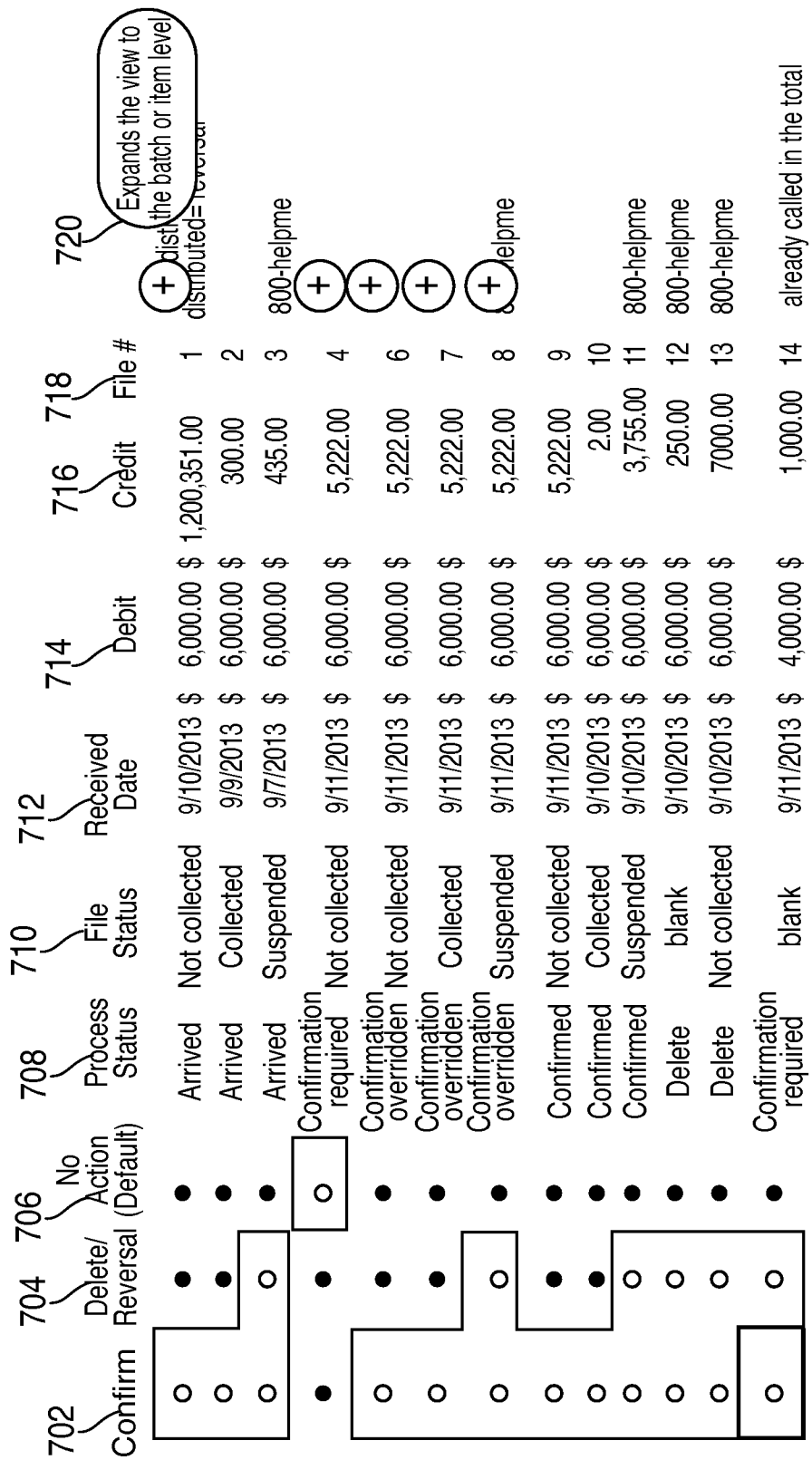
FIG. 7 shows a graphical user interface ("GUI") in accordance with the principles of the invention.

FIG. 7 an exemplary screen that may be available to either a client or an associate. Column 702 shows a confirmed receipt of a file. Column 704 shows that the file has been deleted or reversed. Column 706 indicates that no action has been performed with respect to the file. This may be the default setting for the system.

Column 708 indicates process status for the file. The file may be considered arrived, confirmation required, confirmation overridden, confirmed or deleted.

Column 710 indicates the file status. The status may be not collected, collected, suspended or blank.

Column 712 indicates the received date. Columns 714 and 716 indicate the amount of debit or credit associated with the file. Column 718 may indicate the file number which may be the DTS number that was assigned to the file upon intake by the FI. Column 720 may indicate sources of additional information regarding the file, and/or notes relating to the file recorded by the user.

Thus, methods and apparatus for providing a data validation service are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing a data validation service to an entity, the method comprising:
   receiving, via coaxial cables engaged to a telephone, a file from a client after receiving a signal from a voice response unit;
   changing the file to make it sortable using its protocol;
   assigning a file identification number to the file based on the protocol;
   transmitting to the client a link to an application program interface configured to provide data validation based on the file identification number;
   forwarding the file to an operations area within the entity, wherein the operations area is one of a plurality of operations areas, the file forwarded to each operations area in a predetermined sequence;
   assigning an operations area identification number to the file for at least the duration of an operation within the operations area, the operations identification number co-existing with the file identification number for the duration of the operation, wherein the file identification number pre-dates and outlives the operations identification number;
   overwriting any pre-existing operations area identification number assigned for the duration of a previous operation within a previous operations area;
   receiving operation data associated with the operations identification number from the operations area and storing the data in association with the file identification number; and
   providing data validation via the application program interface based only on the file identification number, wherein the data validation comprises file status information, said file status information comprising text in the form of one of "collected", "not collected" and "suspended".

2. The method of claim 1, wherein the data validation further comprises total amount information.

3. The method of claim 1, wherein the data validation further comprises file received date information.

4. The method of claim 1 further comprising filtering a plurality of files only by the operation area identification number to obtain a filtered sub-set of files from among the plurality of files.

5. The method of claim 1 further comprising using Straight Through Processing to respond to a data validation request.

6. The method of claim 5 wherein implementation of Straight Through Processing is dependent, at least in part, on an entitlement level of a user.

7. The method of claim 1 wherein the operations area is selected from a group consisting of Automated Clearing House, Lockbox, and an account reconciliation process ("ARP").

8. An apparatus for providing a data validation service on behalf of an entity, the apparatus comprising:

a receiver configured to receive, via coaxial cables engaged to a telephone, a file from a client after receiving a signal from a voice response unit;
a processor configured to:
  assign a file identification number to the file;
  transmit to the client a link to an application program interface configured to provide data validation based on the file identification number;
  forward the file to an operations area within the entity, wherein the operations area is one of a plurality of operations areas, the file forwarded to each operations area in a predetermined sequence;
  assign an operations area identification number to the file;
  overwrite any pre-existing operations area identification number assigned for the duration of previous operation within a previous operations area; and
  provide data validation relating to the file via the application program interface based only on the file identification number, wherein the data validation comprises file status information, said file status information comprising text in the form of one of "collected", "not collected" and "suspended".

9. The apparatus of claim 8, wherein the data validation further comprises total amount information.

10. The apparatus of claim 8, wherein the data validation further comprises file received date information.

11. The apparatus of claim 8 further comprising filtering a plurality of files only by the operation area identification number to obtain a filtered sub-set of files from among the plurality of files.

12. The apparatus of claim 8 further comprising using Straight Through Processing to respond to a data validation request.

13. The apparatus of claim 12 wherein implementation of Straight Through Processing is dependent, at least in part, on an entitlement level of a user.

14. The apparatus of claim 8 wherein the operations area is selected from a group consisting of Automated Clearing House, Lockbox, and an account reconciliation process ("ARP").

15. An apparatus for providing a data validation service on behalf of an entity, the apparatus comprising:
a receiver configured to receive, via coaxial cables engaged to a telephone, a file from a client after receiving a signal from a voice response unit;
a processor configured to:
  assign a file identification number to the file;
  generate a link to an application program interface for transmission to the client, the application program interface configured to provide data validation based on the file identification number;
  forward the file to an operations area within the entity, wherein the operations area is one of a plurality of operations areas, the file forwarded to each operations area in a predetermined sequence, wherein, when the file is located in the operations area:
    an operations area identification number is assigned to the file for at least the duration of an operation with the operations area;
    an operations area identification number assigned by a previous operations area is overwritten; and
    the file retains its file identification number originally signed to the file upon receipt by the entity; and
  provide data validation relating to the file via the application program interface based on the file identification number, wherein the data validation comprises file status information, said file status information comprising text in the form of one of "collected", "not collected" and "suspended".

16. The apparatus of claim 15, wherein the data validation further comprises total amount information.

17. The apparatus of claim 15, wherein the data validation further comprises file received date information.

18. The apparatus of claim 15 further comprising filtering a plurality of files only by the file identification number to obtain a filtered sub-set of files from among the plurality of files.

19. The apparatus of claim 15 further comprising using Straight Through Processing to respond to a data validation request.

20. The apparatus of claim 19 wherein implementation of Straight Through Processing is dependent, at least in part, on an entitlement level of a user.

21. The apparatus of claim 15 wherein the operations area is selected from a group consisting of Automated Clearing House, Lockbox, and an account reconciliation process ("ARP").

* * * * *